(12) United States Patent
Furukawa et al.

(10) Patent No.: US 10,351,700 B2
(45) Date of Patent: Jul. 16, 2019

(54) EPOXY RESIN COMPOSITION, PREPREG, CURED RESIN, AND FIBER REINFORCED COMPOSITE MATERIAL (AS AMENDED)

(71) Applicant: TORAY INDUSTRIES, INC., Tokyo (JP)

(72) Inventors: Koji Furukawa, Ehime (JP); Atsuhito Arai, Ehime (JP); Hiroaki Sakata, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/527,251

(22) PCT Filed: Nov. 6, 2015

(86) PCT No.: PCT/JP2015/081253
§ 371 (c)(1),
(2) Date: May 16, 2017

(87) PCT Pub. No.: WO2016/080202
PCT Pub. Date: May 26, 2016

(65) Prior Publication Data
US 2017/0362427 A1 Dec. 21, 2017

(30) Foreign Application Priority Data
Nov. 17, 2014 (JP) ................................. 2014-232370

(51) Int. Cl.
| | | |
|---|---|---|
| *C08J 5/24* | (2006.01) | |
| *C08L 63/00* | (2006.01) | |
| *C08G 59/56* | (2006.01) | |
| *B32B 27/38* | (2006.01) | |
| *C08G 59/40* | (2006.01) | |
| *C08G 59/50* | (2006.01) | |
| *C08J 5/04* | (2006.01) | |

(52) U.S. Cl.
CPC .......... *C08L 63/00* (2013.01); *C08G 59/4035* (2013.01); *C08G 59/5033* (2013.01); *C08G 59/56* (2013.01); *C08J 5/04* (2013.01); *C08J 5/24* (2013.01); *C08J 2363/00* (2013.01); *C08J 2481/06* (2013.01); *C08L 2201/08* (2013.01)

(58) Field of Classification Search
None
See application file for complete search history.

(56) References Cited

U.S. PATENT DOCUMENTS

| | | | |
|---|---|---|---|
| 2006/0122428 A1 | 6/2006 | Wakamori | |
| 2009/0130379 A1* | 5/2009 | Kousaka | B32B 3/12 |
| | | | 428/116 |
| 2010/0014263 A1 | 1/2010 | Tsuchida | |
| 2010/0222461 A1* | 9/2010 | Bongiovanni | C08G 59/4035 |
| | | | 524/35 |
| 2011/0213096 A1* | 9/2011 | Zhu | C08G 59/40 |
| | | | 525/404 |
| 2014/0135443 A1 | 5/2014 | Aerts | |

FOREIGN PATENT DOCUMENTS

| | | |
|---|---|---|
| JP | H01104624 A | 4/1989 |
| JP | 2001261783 A | 9/2001 |
| JP | 2002003581 A | 1/2002 |
| JP | 2003096163 A | 4/2003 |
| JP | 2006131568 A | 5/2006 |
| JP | 2008111106 A | 5/2008 |
| WO | 2004048435 A1 | 6/2004 |
| WO | 2010099029 A1 | 9/2010 |

OTHER PUBLICATIONS

International Search Report and Written Opinion for International Application No. PCT /JP2015/081253, dated Dec. 22, 2015—6 Pages.

* cited by examiner

*Primary Examiner* — Michael J Feely
(74) *Attorney, Agent, or Firm* — RatnerPrestia

(57) ABSTRACT

A epoxy resin composition includes a given epoxy resin [A], an aromatic amine compound [B], an organic acid hydrazide compound [C] having a structural formula represented by general formula (I) or (II) (X is a structure selected from among monocyclic and polycyclic aromatic ring structures, polycyclic aromatic ring structures, and aromatic heterocyclic structures and optionally has, as a substituent, any of $C_4$ or lower alkyl groups, a hydroxy group, and an amino group), and a thermoplastic resin [D], wherein the amount of the constituent element [C] is 1-25 parts by mass per 100 parts by mass of the constituent element [A], the epoxy resin composition, after having been held at 80° C. for 2 hours, having a viscosity which is up to 2.0 times the initial viscosity at 80° C.

[Chemical Formula 1]

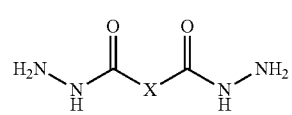

(I)

[Chemical Formula 2]

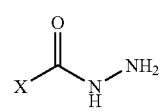

(II)

11 Claims, No Drawings

EPOXY RESIN COMPOSITION, PREPREG, CURED RESIN, AND FIBER REINFORCED COMPOSITE MATERIAL (AS AMENDED)

CROSS REFERENCE TO RELATED APPLICATIONS

This is the U.S. National Phase application of PCT/JP2015/081253, filed Nov. 6, 2015, which claims priority to Japanese Patent Application No. 2014-232370, filed Nov. 17, 2014, the disclosures of each of these applications being incorporated herein by reference in their entireties for all purposes.

TECHNICAL FIELD OF THE INVENTION

The present invention relates to an epoxy resin composition which has excellent heat resistance and combines a latent property with excellent curability that renders the composition curable in a short time and which is for use in producing a fiber reinforced composite material, a prepreg formed by impregnating the epoxy resin composition into reinforced fibers, a cured resin formed by curing the epoxy resin composition, and a fiber reinforced composite material including the epoxy resin composition and the reinforced fibers.

BACKGROUND OF THE INVENTION

Heretofore, a fiber reinforced composite material including reinforced fibers such as carbon fibers and glass fibers and a thermoplastic resin such as an epoxy resin and a phenolic resin, has been applied to many fields such as aerospace, automobiles, rail cars, marine vessels, civil engineering and construction and sporting goods since it is lightweight yet is excellent in mechanical characteristics such as strength and rigidity, heat resistance and corrosion resistance. Particularly, in the applications which high performance is required of, a fiber reinforced composite material using continuous reinforced fibers is used. As the reinforced fibers, carbon fibers having excellent specific strength and excellent specific modulus are often used, and as a matrix resin, a thermoplastic resin, particularly, an epoxy resin which has adhesiveness to carbon fibers, heat resistance, elastic modulus and chemical resistance, and is the lowest in cure shrinkage is often used. In recent years, required characteristics of the fiber reinforced composite material become severe as a usage example of the material increases. Particularly, when the fiber reinforced composite material is applied to aerospace applications or structural materials of vehicles or the like, it is required to adequately maintain properties even in a high temperature and/or a high humidity condition. However, although a polymer-based composite material generally has an advantage of light weight, its heat resistance is not high, and particularly heat resistance in a high humidity condition may be insufficient, and therefore applicable use may be limited.

As a curing agent of the epoxy resin, aliphatic amines, aromatic amine compounds, acid anhydrides, and imidazole derivatives are used in combination. Particularly, for aerospace applications which the heat resistance in a high humidity condition is required of, aromatic amine compounds which are excellent in thermal stability of a resin composition and heat resistance of a cured object are often used.

However, since the aromatic amine compound has a lower reactivity with the epoxy resin than other curing agents, prolonged heating at a high curing temperature near 180° C. is required during molding an epoxy resin composition. If the reactivity of the epoxy resin composition is low like this, disadvantages that it takes a long time for molding resulting in high energy cost in molding become obvious. Therefore, a technology which enables the epoxy resin composition to be cured at low temperature in a short time has been desired.

Heretofore, a technique of using a curing accelerator for accelerating curing of the epoxy resin composition is known as one of technologies of curing an epoxy resin in a short time. As such a curing accelerator, phosphorus-based curing accelerators, metal carboxylates, Lewis acids, Brønsted acids and salts of these acids are known, as described in Patent Document 1 or 2.

Further, as other curing accelerators, tertiary amines and salts thereof, imidazoles and salts thereof, and urea compounds are known, as described in Patent Document 3 or 4.

PATENT DOCUMENTS

Patent Document 1: Japanese Patent Laid-open Publication No. 2001-261783
Patent Document 2: Japanese Patent Laid-open Publication No. 2002-003581
Patent Document 3: Japanese Patent Laid-open Publication No. 2003-096163
Patent Document 4: WO 2004/048435 A

SUMMARY OF THE INVENTION

However, when the curing accelerator described in Patent Document 1 or 2 is used, since a pot life is short and a curing reaction of the epoxy resin proceeds during a kneading step of a resin, a production step of an intermediate base material such as a prepreg, these curing agents have disadvantages that work efficiency and properties of a cured object are deteriorated and are low in practicality.

Further, when a curing reactivity of a resin is improved with use of the curing accelerator described in Patent Document 3 or 4, there is a problem that the pot life is decreased or a glass transition temperature of a cured resin is significantly lowered, and excellent rapid curability and excellent thermal stability/heat resistance have not been achieved simultaneously.

Thus, it is an object of the present invention to provide an epoxy resin composition which has excellent heat resistance and combines a latent property with excellent curability that renders the composition curable in a short time, and a prepreg and a fiber reinforced composite material respectively using the epoxy resin composition.

In order to solve such problems, the present invention provides the following means. That is, an epoxy resin composition including the following constituent elements [A], [B], [C] and [D]:
[A]: epoxy resin,
[B]: aromatic amine compound,
[C]: organic acid hydrazide compound having a structural formula represented by a general formula (I) or a general formula (II):

[Chemical Formula 1]

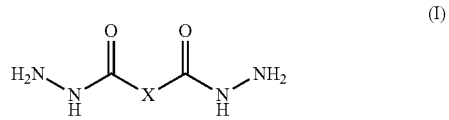
(I)

-continued

[Chemical Formula 2]

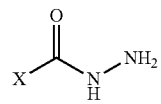

(II)

in which X is a structure selected from among monocyclic and polycyclic aromatic ring structures, polycyclic aromatic ring structures and aromatic heterocyclic structures, and optionally has, as a substituent, any of alkyl groups having 4 or less carbon atoms, a hydroxy group and amino group, and

[D]: thermoplastic resin, wherein the amount of the constituent element [C] is 1 to 25 parts by mass with respect to 100 parts by mass of the constituent element [A], and the viscosity of the epoxy resin composition after having been held at 80° C. for 2 hours, is up to 2.0 times larger than the initial viscosity at 80° C.

According to the present invention, it is possible to provide an epoxy resin composition which achieves high curability that renders the composition moldable in a short time and a good pot life at a process temperature of a prepreg production simultaneously by compounding, as a curing accelerator, a specific organic acid hydrazide compound in an epoxy resin composition containing an aromatic amine compound as a curing agent. Further, a fiber reinforced composite material obtained by curing the epoxy resin composition and the prepreg of the present invention can reduce considerably a molding time and molding cost of application products such as aircraft structural members, windmill blades, automotive outer panels and computer applications, for example, a IC tray and a laptop computer because it becomes possible to mold in a short time compared with a conventional fiber reinforced composite material not containing a curing accelerator compounded.

DETAILED DESCRIPTION OF EMBODIMENTS OF THE INVENTION

The epoxy resin composition of an embodiment of the present invention is an epoxy resin composition including the following constituent elements [A], [B], [C] and [D]:

[A]: epoxy resin,

[B]: aromatic amine compound,

[C]: organic acid hydrazide compound having a structural formula represented by the above-mentioned general formula (I) or general formula (II)

in which X is a structure selected from among monocyclic and polycyclic aromatic ring structures, polycyclic aromatic ring structures and aromatic heterocyclic structures, and optionally has, as a substituent, any of alkyl groups having 4 or less carbon atoms, a hydroxy group and amino group, and

[D]: thermoplastic resin, wherein the amount of the constituent element [C] is 1 to 25 parts by mass with respect to 100 parts by mass of the constituent element [A], and the viscosity of the epoxy resin composition after having been held at 80° C. for 2 hours, is up to 2.0 times larger than the initial viscosity at 80° C.

A preferred exemplification of the constituent element [A] used in the present invention is an epoxy resin having two or more glycidyl groups in a molecule. In the case of the epoxy resin having less than two glycidyl groups in a molecule, it is not preferred since a glass transition temperature of a cured object obtained by heating/curing a mixture of the epoxy resin and a curing agent described later is lowered. Examples of the epoxy resins used in the present invention include bisphenol type epoxy resins such as a bisphenol A type epoxy resin, a bisphenol F type epoxy resin, a bisphenol AD type epoxy resin and a bisphenol S type epoxy resin; brominated epoxy resins such as a tetrabromobisphenol A diglycidyl ether; an epoxy resin having a biphenyl skeleton; an epoxy resin having a naphthalene skeleton; an epoxy resin having a dicyclopentadiene skeleton; novolak type epoxy resins such as a phenol novolak type epoxy resin and a cresol novolak type epoxy resin; glycidyl amine type epoxy resins such as N,N,O-triglycidyl-m-aminophenol, N, N,O-triglycidyl-p-aminophenol, N, N,O-triglycidyl-4-amino-3-methylphenol, N,N,N',N'-tetraglycidyl-4,4'-methylenedianiline, N, N, N',N'-tetraglycidyl-2,2'-diethyl-4,4'-methylenedianiline, N,N,N',N'-tetraglycidyl-m-xylylenediamine, N N-diglycidylaniline and N,N-diglycidyl-o-toluidine; resorcinol diglycidyl ether; and triglycidyl isocyanurate. Particularly, in the case of aircraft/spacecraft applications, it is preferred to contain a glycidyl amine type epoxy resin by which a cured object having a high glass transition temperature and a high elastic modulus is obtained.

These epoxy resins may be used singly or may be used as an appropriate formulation thereof. It is effective for the control of flowability of a matrix resin at the time of thermosetting of the resulting prepreg that an epoxy resin exhibiting flowability at an optional temperature is compounded with an epoxy resin not exhibiting flowability at the optional temperature. For example, in the thermosetting, if the flowability exhibited until the matrix resin is gelated is large, orientation of the reinforced fiber may be disordered, or a fiber mass content may be out of a predetermined range since the matrix resin has flown out of a system. Consequently, mechanical properties of the resulting fiber reinforced composite material can be deteriorated. Further, it is also effective for rendering tackiness properties or drape of the resulting prepreg appropriate to combine plural kinds of epoxy resins exhibiting various viscoelastic behavior at an optional temperature.

An epoxy compound other than the constituent element [A], for example, a mono-epoxy compound having only one epoxy group in a molecule or an alicyclic epoxy resin may be appropriately compounded in the epoxy resin composition of the present invention within a range that does not lower significantly the heat resistance and mechanical properties.

The constituent element [B] in the present invention is used as a curing agent for heating/curing the constituent element [A]. Examples of such aromatic amine compounds include 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, 4,4'-diaminodiphenylmethane, 4,4'-diaminodiphenylsulfone, 3,3'-diaminodiphenylsulfone, m-phenylenediamine, m-xylylenediamine, diethyl toluene diamine and the like.

Particularly, in the case of aircraft/spacecraft applications, it is preferred to use 4,4'-diaminodiphenylsulfone and 3,3'- diaminodiphenylsulfone by which a cured object having excellent heat resistance and a high elastic modulus and having a small linear expansion coefficient and a small reduction of heat resistance due to water absorption, is obtained. These aromatic amine compounds may be used singly or may be used as an appropriate formulation thereof. Further, the aromatic amine compound may be used in either form of powder or liquid in mixing the aromatic amine compound with other components, and a mixture of a powdery aromatic amine compound and a liquid aromatic amine compound may be used.

The organic acid hydrazide compound serving as the constituent element [C] in the present invention is used as a curing accelerator that renders the so-called latent property developed. Herein, the latent property is a characteristic of keeping significantly a curing reactivity low in the kneading step of a resin composition or in the production step of an intermediate base material such as a prepreg.

The constituent element [C] in an embodiment of the present invention is an organic acid hydrazide compound having a structural formula represented by the above-mentioned general formula (I) or general formula (II). In the general formula (I) and the general formula (II), X is a structure selected from among monocyclic and polycyclic aromatic ring structures, polycyclic aromatic ring structures and aromatic heterocyclic structures, and optionally has, as a substituent, any of alkyl groups having 4 or less carbon atoms, a hydroxy group and amino group.

The organic acid hydrazide compound represented by the general formula (I) or the general formula (II) is preferred since it has an aromatic ring structure in its molecule, and therefore it has a more rigid molecular skeleton than aliphatic hydrazide resulting in excellent heat resistance in being formed into a cured epoxy resin object. Further, the organic acid hydrazide compound represented by the general formula (I) or the general formula (II) is preferred since it has excellent reactivity with an epoxy resin in comparison to aliphatic hydrazide and provides a high cure accelerating property in being formed into an epoxy resin composition.

Herein, examples of aromatic rings represented by X in the general formula (I) or the general formula (II) include a benzene ring for the monocyclic aromatic ring; a biphenyl ring and a triphenyl ring for the polycyclic aromatic ring; and a naphthalene ring, an anthracene ring and a fused ring formed of a benzene ring and a five-membered unsaturated ring for the polycyclic aromatic ring.

Examples of aromatic heterocycle represented by X in the general formula (I) or the general formula (II) include a pyridine ring, a pyrazine ring, a pyrimidine ring, a quinoline ring, a quinoxaline ring, a naphthyridine ring, a pyrimidopyrimidine ring, a benzoquinoline ring, a phenanthroline ring, an imidazole ring, an oxazole ring, an oxadiazole ring, a triazole ring, a triazole ring, a thiadiazole ring, a benzoxazole ring, a benzothiazole ring, a benzimidazole ring, a phenanthro imidazole ring, and the like.

Preferred examples of such organic acid hydrazide compounds include 3-hydroxy-2-naphthoic acid hydrazide, 2,6-naphthalenedicarbodihydrazide, salicylic hydrazide, terephthalic dihydrazide, and isophthalic dihydrazide. Two or more types of these organic acid hydrazide compounds may be mixed and compounded for use as required.

The constituent element [C] is preferably used in the form of particles which are insoluble in the constituent element [A] in order to improve thermal stability. Since the constituent element [C] is dispersed in the constituent element [A] in an insoluble state, a curing reaction hardly proceeds until the constituent element [C] is dissolved by heating. When the resin composition is heated at high-temperature higher than a certain temperature, the constituent element [C] is dissolved and initiates a curing reaction with the epoxy resin composition serving as the constituent element [A] together with the aromatic amine compound serving as the constituent element [B]. The average particle diameter of the constituent element [C] is preferably 100 μm or less, more preferably 50 μm or less, and still more preferably 30 μm or less. By setting the average particle diameter of the [C] to 100 μm or less, the [C] is easily dissolved in curing a resin and the curability of the resin composition can be improved. Further, by setting the average particle diameter of the [C] to 100 μm or less, it is possible to suppress the lowering of the mechanical characteristics of of the cured resin due to a curing accelerator remaining without being dissolved.

The average particle diameter referred to herein is measured with use of LA-950 manufactured by HORIBA, Ltd. using a laser diffraction scattering method. The results on a volume basis measured by using "Araldite (registered trademark)" GY282 (component: bisphenol F type epoxy resin, produced by HUNTSMAN JAPAN K.K.) as a dispersion medium are employed as a measurement result of a particle size distribution, and a particle diameter at 50% (median diameter) in a cumulative curve of the resulting particle size distribution is used as the average particle diameter.

A melting point of the constituent element [C] in the present invention is preferably 180° C. or higher. When the melting point of the constituent element [C] is 180° C. or higher, the constituent element [C] becomes hard to be dissolved in the constituent element [A], and therefore a pot life of the epoxy resin composition during the kneading step of a resin or the production step of a prepreg can be improved. When the pot life is improved, it is possible to suppress defective impregnation of a resin into reinforced fibers or a reduction of the tackiness properties of a prepreg due to an increase of the viscosity of a resin composition. The pot life referred to herein refers to viscosity stability of the epoxy resin composition in a region of as low-temperature as room temperature to 80° C. The viscosity stability can be identified, for example, by evaluating the viscosity change of the epoxy resin composition in holding at 80° C. for 2 hours by dynamic viscoelasticity measurement.

Further, the melting point referred to herein can be determined from a peak temperature of a melting curve obtained in raising a temperature from room temperature at a temperature raising rate of 20° C./min in a differential scanning calorimeter (DSC).

It is preferred that the compounded amount of the constituent element [C] is 1 to 25 parts by mass, preferably 1 to 15 parts by mass, and more preferably 3 to 15 parts by mass with respect to 100 parts by mass of the constituent element [A]. By setting the compounded amount to 1 part by mass or more, the effect of improving the curing reactivity of the resin composition is achieved. Further, by setting the compounded amount to 25 parts by mass or less, it is possible to suppress reductions of thermal stability of the resin composition and heat resistance of the cured object.

In the present invention, the compounded amounts of the constituent element [B] and the constituent element [C] are preferably such amounts that a total of active hydrogens of the constituent element [B] and the constituent element [C] is in the range of 0.7 to 1.3 equivalent with respect to 1 equivalent of the epoxy group of the constituent element [A], and the constituent element [B] and the constituent element [C] are more preferably compounded so that the total of active hydrogens of the [B] and the [C] is 0.8 to 1.2 equivalent. Herein, the active hydrogen refers to a highly reactive hydrogen atom which is coupled with nitrogen, oxygen or sulfur in an organic compound, and, for example, a number of active hydrogens of an amino group is 2. Since in the hydrazide, only hydrogen atoms coupled with a nitrogen atom at a terminal contribute to a reaction with an epoxy group, the number of the active hydrogens per one hydrazide group is counted as 2. When a ratio between the epoxy group and the active hydrogen is within the predetermined range described above, it is preferred because a cured resin which is excellent in heat resistance and elastic modulus is attained.

In the present invention, it is possible to compound, as required, a hydrazide compound other than the hydrazide compounds described in the general formula (I) or the general formula (II) in addition to the constituent element [C]. Examples of such a hydrazide compound include carbodihydrazide, malonic hydrazide, succinic dihydrazide, adipic dihydrazide, sebacic dihydrazide, dodecanedioic dihydrazide, propionic hydrazide, and the like. These hydrazide compounds have the effect of improving the curing reactivity of the resin composition as with the constituent element [C]. However, a compounded amount of these hydrazide compounds other than the hydrazide compounds described in the general formula (I) or the general formula (II) is large, the heat resistance of the cured resin may be lowered or the thermal stability of the resin composition may be lowered, and therefore the compounded amount of such a hydrazide compound is preferably 10 parts by mass or less with respect to 100 parts by mass of the constituent element [A].

Other curing accelerators may be used together in addition to the constituent element [C] in the present invention within a range that does not impair the heat resistance and the thermal stability of the epoxy resin composition. Examples of other curing accelerators include tertiary amine, a Lewis acid complex, an onium salt, an imidazole compound, a urea compound and the like. Compounded amounts of other curing accelerators need to be appropriately adjusted depending on types to be used, and the amounts are 10 parts by mass or less, and preferably 5 parts by mass or less with respect to 100 parts by mass of the whole epoxy resins. When the compounded amounts of other curing accelerators are set to such a range or less, deterioration of the thermal stability of the resulting resin composition can be suppressed. However, when 3-(3,4-dichlorophenyl)-1,1-dimethylurea is compounded, excellent rapid curability can be imparted to the epoxy resin composition, but simultaneously, the thermal stability at 80° C. of the epoxy resin composition is markedly lowered, and therefore it is preferred that the epoxy resin composition of the present invention does not contain 3-(3,4-dichlorophenyl)-1,1-dimethylurea.

The constituent element [D] in the present invention is compounded for controlling the tackiness properties of the resulting prepreg, controlling the flowability of a matrix resin in curing a prepreg by heating and imparting toughness without deteriorating heat resistance and elastic modulus of the resulting fiber reinforced composite material. As such a thermoplastic resin, a thermoplastic resin including a polyarylether skeleton is preferred, and examples thereof include polysulfone, polyphenylsulfone, polyethersulfone, polyetherimide, polyphenylene ether, polyetheretherketone, polyetherethersulfone and the like. These thermoplastic resins including a polyarylether skeleton may be used singly or may be used as an appropriate formulation thereof. Among these thermoplastic resins, polyethersulfone can be preferably used since it can impart toughness without deteriorating heat resistance and mechanical properties of the resulting fiber reinforced composite material.

As a terminal functional group of each of these thermoplastic resins including a polyarylether skeleton, primary amine, secondary amine, a hydroxyl group, a carboxyl group, a thiol group, acid anhydrides, halogen groups (chlorine, bromine) and the like can be used. Among these, when the halogen group having less reactivity with the epoxy resin is a terminal group, a prepreg having excellent preservation stability can be obtained, and on the other hand, when a functional group other than the halogen group is a terminal group, it is preferred because the thermoplastic resin has a high reactivity with the epoxy resin and therefore a resin composition excellent in adhesion between the epoxy resin and the thermoplastic resin can be obtained.

A compounded amount of the constituent element [D] in the present invention is preferably in a range of 5 to 40 parts by mass, more preferably in a range of 10 to 35 parts by mass, and still more preferably in a range of 15 to 30 parts by mass with respect to 100 parts by mass of the constituent element [A]. By setting the compounded amount of the constituent element [D] to such a range, it is possible to have a balance between the viscosity of the epoxy resin composition/tackiness properties of the resulting prepreg and mechanical characteristics of the resulting fiber reinforced composite material.

When the epoxy resin composition of the present invention is used as a matrix resin of the prepreg, the initial viscosity at 80° C. of the epoxy resin composition is preferably in the range of 0.5 to 200 Pa·s from the viewpoint of the tackiness properties or drape of a prepreg. When the initial viscosity at 80° C. is 0.5 Pa·s or more, an excessive resin flow hardly occurs in molding the fiber reinforced composite material and variations of a reinforced fiber content can be suppressed. Further, when the initial viscosity at 80° C. is 0.5 Pa·s or more, the constituent element [C] is not precipitated in the epoxy resin composition during molding the prepreg and is uniformly dispersed, and therefore a fiber reinforced composite material having a uniform cure degree can be obtained. On the other hand, when the initial viscosity at 80° C. is 200 Pa·s or less, the epoxy resin composition can be adequately impregnated into the reinforced fibers in producing the prepreg and voids are hardly generated in the resulting fiber reinforced composite material, and therefore a reduction in strength of the fiber reinforced composite material can be suppressed. The initial viscosity at 80° C. of the epoxy resin composition is preferably in the range of 0.5 to 200 Pa·s, more preferably in the range of 1 to 150 Pa·s, and still more preferably in the range of 5 to 100 Pa·s so that in a prepreg production step, the epoxy resin composition is easily impregnated into reinforced fibers and a prepreg having a high fiber mass content is produced.

In the epoxy resin composition of an embodiment of the present invention, the viscosity of the epoxy resin composition after having been held at 80° C. for 2 hours is up to 2.0 times larger than the initial viscosity at 80° C., preferably up to 1.8 times, more preferably up to 1.5 times, and still more preferably up to 1.2 times. Herein, the magnification of thickening at 80° C. can be used as a measure of the pot life of the epoxy resin composition in the kneading step of a resin composition or the production step of a prepreg. That is, the smaller magnification of thickening at 80° C. leads to a good pot life at a temperature of 80° C. or lower. When the magnifications of thickening of the epoxy resin compositions after having been held at 80° C. for 2 hours is up to 2.0 times, the thermal stability of the resin composition is high and an impregnating property of a resin into reinforced fibers is not deteriorated in a prepreg production step to hardly cause voids in a molded article. Further, the initial viscosity at 80° C. means a viscosity of the resin composition after having been held at 80° C. for 1 minute.

Herein, the viscosity refers to a complex viscosity $\eta^*$ measured in conditions of a frequency of 0.5 Hz and a gap of 1 mm with use of a parallel plate of 40 mm in diameter using a dynamic viscoelasticity measuring device (a rheometer RDA 2: manufactured by Rheometrics, Inc., or a rheometer ARES: manufactured by TA Instruments Co.). The viscosity $\eta^*_1$ of the resin composition after having been held at 80° C. for 1 minute and the viscosity $\eta^*_{120}$ of the resin composition after having been held at 80° C. for 2 hours are measured, and the thickening magnification is determined from $\eta^*_{120}/\eta^*_1$.

When the epoxy resin composition is applied to aerospace applications and structural materials of vehicles or the like, high heat resistance is required not only of a cured object in a dry state of the epoxy resin composition but also of a cured object in a high humidity condition. The heat resistance in a high humidity condition can be evaluated, for example, by allowing a cured object obtained by curing a resin composition at 180° C. for 2 hours to absorb water by immersing the cured object in boiling water at 1 atmospheric pressure for 48 hours, and then measuring a glass transition temperature of the cured object by dynamic viscoelasticity measurement or differential scanning calorimetry. In the epoxy resin composition of the present invention, a glass transition temperature after water absorption in the above-mentioned conditions is preferably 115° C. or higher, more preferably 120° C. or higher, and still more preferably 125° C. or higher. When the glass transition temperature of the epoxy resin composition after absorbing water is higher, it is preferred because the epoxy resin composition becomes applicable to a member requiring higher heat resistance.

In general, in the cured resin in which the organic acid hydrazide compound is compounded as a curing accelerator, water absorption is increased compared with a cured resin in which the hydrazide compound is not compounded, and a glass transition temperature of the cured resin after absorbing water may be lowered. Therefore, in the resin composition in which the hydrazide compound is compounded as a curing accelerator, it is not easy to achieve the excellent curing reactivity and the high glass transition temperature after absorbing water simultaneously. In order to solve such a problem, in the present invention, by introducing an aromatic ring or a polycyclic aromatic ring into a molecular structure of the organic acid hydrazide compound to be compounded, the water absorption was lowered and the lowering of the glass transition temperature after water absorption could be suppressed compared with an organic acid hydrazide compound having an aliphatic chain. Further, since a resin composition in which the hydrazide compound having the aromatic ring or the polycyclic aromatic ring in a molecular structure was compounded as a curing accelerator, was used, the water absorption of the cured object could be lowered and the lowering of the elastic modulus after water absorption could be suppressed as with the glass transition temperature.

The thermoplastic resin particles may be compounded in the epoxy resin composition of the present invention within a range that does not lower significantly the heat resistance and the rapid curability. The thermoplastic resin particles are compounded in order to add the impact resistance of the fiber reinforced composite material obtained in the present invention. The fiber reinforced composite material generally assumes a laminate structure, and when an impact is added to the structure, high stress is generated between layers to cause delamination damage. Therefore, when resistance to external impact is improved, it is only necessary to improve toughness of a resin layer formed between layers including the reinforced fibers (hereinafter, sometimes referred to as "interlayer resin layer") of the fiber reinforced composite material. In the present invention, the toughness is improved by compounding the constituent element [D] in the epoxy resin serving as a matrix resin, and in order to further selectively increase the toughness of the interlayer resin layer of the fiber reinforced composite material of the present invention, thermoplastic resin particles are preferably compounded.

As such a thermoplastic resin, polyamide and polyimide can be preferably used, and particularly polyamide which can substantially improve impact resistance because of excellent toughness is most preferred. As the polyamide, nylon 12, nylon 11, nylon 6, nylon 66, nylon 6-nylon 12 copolymer, nylon converted to a semi-IPN (interpenetrating polymer network structure) (semi-IPN nylon) in an epoxy compound described in Example 1 of Japanese Patent Laid-open Publication No. 01-104624, and the like can be suitably used. With respect to a shape of the thermoplastic resin particle, spherical particles or non-spherical particles may be used, or porous particles may be used; however, the spherical particle is a preferred aspect in that the spherical particle is excellent in viscoelasticity since a spherical shape does not deteriorate flow properties of a resin, and there is not a starting point of stress concentration to provide high impact resistance.

As commercially available products of the polyamide particles, SP-500, SP-10, TR-1, TR-2, 842P-48 and 842P-80 (produced by Toray Industries, Inc.), "Orgasol (registered trademark)" 1002D, 2001UD, 2001EXD, 2002D, 3202D, 3501D and 3502D (produced by ARKEMA Inc.), "Grilamid (registered trademark)" TR90 (produced by EMS-CHEMIE (Japan) Ltd.), "TROGAMID (registered trademark)" CX7323, CX9701 and CX9704 (produced by Degussa AG), and the like can be used. These polyamide particles may be used singly or may be used in combination thereof.

It is necessary to retain thermoplastic resin particles in the interlayer resin layer for selectively increasing the toughness of the interlayer resin layer of the fiber reinforced composite material of the present invention, and therefore the average particle diameter of the thermoplastic resin particles is desirably in the range of 5 to 50 μm, preferably in the range of 7 to 40 μm, and more preferably in the range of 10 to 30 μm. By setting the average particle diameter to 5 μm or more, particles do not penetrate into a bundle of the reinforced fibers and can stay in the interlayer resin layer of the resulting fiber reinforced composite material, and by setting the average particle diameter to 50 μm or less, a thickness of a matrix resin layer on the prepreg surface is made to be appropriate, and therefore it is possible to render the fiber mass content appropriate in the resulting fiber reinforced composite material.

The prepreg of the present invention is obtained by forming the above-mentioned epoxy resin compositions into a matrix resin and combining the resin compositions with reinforced fibers. Preferred examples of the reinforced fibers include carbon fibers, graphite fibers, aramid fibers, glass fibers and the like, and among these fibers, carbon fibers are particularly preferred.

The prepreg of the present invention can be produced by various publicly known methods. The prepreg can be produced by a method, for example, a wet method in which the matrix resin is dissolved in an organic solvent selected from among acetone, methyl ethyl ketone and methanol to lower the viscosity of the resin and the matrix resin is impregnated into reinforced fibers, or a hot-melt method of lowering the viscosity of the matrix resin by heating without using an organic solvent and impregnating the matrix resin into reinforced fibers.

In the wet method, reinforced fibers are immersed into a liquid containing the matrix resin and then pulled up, and the organic solvent is evaporated using an oven, etc., and thereby a prepreg can be obtained.

Further, in the hot-melt method, it is possible to employ a method of directly impregnating the matrix resin whose viscosity is lowered by heating into reinforced fibers, or a method in which once a release paper sheet with a resin film obtained by coating a release paper or the like with a matrix resin (hereinafter, sometimes referred to as "resin film") is prepared at first, and the resin film is overlaid on a reinforced fiber side from both sides or one side of the reinforced fibers and heated/pressurized to impregnate the matrix resin into the reinforced fibers.

As a method of producing the prepreg of the present invention is preferred the hot-melt method in which the reinforced fibers are impregnated with a matrix resin without using an organic solvent since no organic solvent substantially remains in the prepreg.

The prepreg preferably has an amount of the reinforced fiber per unit area of 70 to 2000 $g/m^2$. When such an amount of the reinforced fiber is less than 70 $g/m^2$, a number of laminations needs to be increased in order to obtain a predetermined thickness in forming a fiber reinforced composite material and the process may be complicated. On the other hand, when the amount of the reinforced fiber is more than 2000 $g/m^2$, the drape of the prepreg tends to be deteriorated.

The fiber mass content of the prepreg is preferably 30 to 90% by mass, more preferably 35 to 85% by mass, and still more preferably 40 to 80% by mass. When the fiber mass content is less than 30% by mass, an amount of the resin is too large, the advantage of the fiber reinforced composite material that specific strength and specific modulus are excellent cannot be attained, and an amount of heat generation at the time of curing in molding the fiber reinforced composite material may become too high. Also, when the fiber mass content is more than 90% by mass, there is a possibility that defective impregnation of a resin occurs and the resulting composite material has many voids.

The fiber reinforced composite material of the present invention can be produced by a method of laminating the above-mentioned prepregs of the present invention in the predetermined form and pressurizing/heating the prepregs to cure the resin as an example. Herein, as the method of applying heat and pressure, a press molding method, an autoclave molding method, a backing molding method, a wrapping tape method, an internal pressure molding method or the like is employed.

Moreover, a carbon fiber reinforced composite material can also be prepared by a method of directly impregnating the epoxy resin composition of the present invention into reinforced fibers without using a prepreg and then heating/curing the resin composition, for example, a molding method such as a hand lay-up method, a filament winding method, a protrusion method, a resin injection molding method or a resin transfer molding method.

EXAMPLES

Hereinafter, the present invention will be described in more detail by way of examples. However, a scope of the present invention is not intended to be limited to these examples. In addition, a unit of a composition ratio "part(s)" means a part(s) by mass unless otherwise noted. Further, measurement of various characteristics (properties) was carried out under the environment of 23° C. in temperature and 50% in relative humidity unless otherwise noted.

<Materials Used in Examples and Comparative Examples>

(1) Constituent element [A]: epoxy resin,

"Araldite (registered trademark)" MY0600

(triglycidyl-m-aminophenol, epoxy equivalent weight: 118, produced by HUNTSMAN ADVANCED MATERIALS)

"Araldite (registered trademark)" MY0510

(triglycidyl-p-aminophenol, epoxy equivalent weight: 118, produced by HUNTSMAN ADVANCED MATERIALS)

ELM434 (tetraglycidyldiaminodiphenyl methane, epoxy equivalent weight: 120, produced by Sumitomo Chemical Co., Ltd.)

"EPICLON (registered trademark)" 830 (bisphenol F type epoxy resin, epoxy equivalent weight: 172, produced by DIC Corporation)

"jER (registered trademark)" 1010 (bisphenol A type epoxy resin, epoxy equivalent weight: 4000, produced by Mitsubishi Chemical Corporation)

"AER (registered trademark)" 4152 (epoxy resin having an oxazolidone ring, epoxy equivalent weight: 189, produced by Asahi Kasei E-materials Corporation)

(2) Constituent element [B]: aromatic amine compound, 3,3'-DAS (3,3'-diaminodiphenylsulfone, produced by Mitsui Fine Chemicals, Inc.)

"SEIKACURE (registered trademark)" S (4,4'-diaminodiphenylsulfone (4,4'-DDS), produced by Seika Corporation)

(3) Constituent element [C]: Organic acid hydrazide compound (curing accelerator)

3-hydroxy-2-naphthoic acid hydrazide (melting point: 206° C., average particle diameter: 22 µm, produced by Otsuka Chemical Co., Ltd.)

2,6-naphthalenedicarbodihydrazide (melting point: 300° C. or higher, average particle diameter: 30 µm, produced by JAPAN FINECHEM INC.)

Isophthalic dihydrazide (melting point: 220° C., average particle diameter: 13 µm, produced by Otsuka Chemical Co., Ltd.)

(4) Constituent element [D]: thermoplastic resin

"SUMIKAEXCEL (registered trademark)" PES 5003P (polyethersulfone, produced by Sumitomo Chemical Co., Ltd.)

"VIRANTAGE (registered trademark)" VW-10700RFP (polyethersulfone having a hydroxyl terminal group, produced by SOLVAY SPECIALTY POLYMERS JAPAN K.K.)

(5) Constituent element [E]: Carbon fiber

"Torayca (registered trademark)" T800S-24K-10E (number of fibers 24000, fineness: 1033 tex, tensile modulus of elasticity: 294 GPa, density: 1.8 $g/cm^3$, produced by Toray Industries, Inc.)

(6) Other Components

Adipic dihydrazide (melting point: 180° C., average particle diameter: 23 µm, produced by Otsuka Chemical Co., Ltd.)

"CUREZOL (registered trademark)" 2P4MHZ-PW (2-phenyl-4-methyl-5-hydroxymethylimidazole, melting point: 193° C., average particle diameter: 3 µm, produced by SHIKOKU CHEMICALS CORPORATION)

Dodecanedihydrazide (melting point: 190° C., average particle diameter: 7 μm, produced by Otsuka Chemical Co., Ltd.)

Dicyandiamide (DICY7, melting point: 210° C., average particle diameter: 3 μm, produced by Mitsubishi Chemical Corp.)

3-(3,4-dichlorophenyl)-1,1-dimethylurea (DCMU99, melting point: 159° C., average particle diameter: 8 μm, produced by Hodogaya Chemical Co., Ltd.)

N,N-dimethylacrylamide (melting point: −40° C., liquid, produced by Tokyo Chemical Industry Co., Ltd.)

<Evaluation Methods>

Using the following measurement methods, epoxy resin compositions and prepregs of Examples were measured.

(1) Measurement Method of Viscosities of Epoxy Resin Composition After Having Been Held at 80° C. for 1 Minute and After Having Veen Held at 80° C. for 2 Hours The viscosity of the epoxy resin composition was measured in torsion mode (measurement frequency: 0.5 Hz) under the condition that parallel plates of a flat plate of 40 mm in diameter were used for upper and lower measuring jigs and the epoxy resin composition was set so as to be 1 mm in a distance between these jigs using a dynamic viscoelasticity measuring device ARES-2KFRTN1-FCO-STD (manufactured by TA Instruments Co.). The viscosity $\eta^*_1$ of the resin composition after having been held at 80° C. for 1 minute and the viscosity $\eta^*_{120}$ of the resin composition after having been held at 80° C. for 2 hours were measured, and the thickening magnification (pot life) was determined from $\eta^*_{120}/\eta^*_1$.

(2) Measurement Method of Glass Transition Temperature of Cured Epoxy Resin Object After Water Absorption After the epoxy resin composition was injected into a mold, its temperature was raised from 30° C. at a rate of 1.5° C./min in a hot-air drier and the resin composition was cured by heating at 180° C. for 2 hours. Thereafter, the temperature of the epoxy resin composition was lowered to 30° C. at a rate of 2.5° C./min to prepare a cured resin plate with a thickness of 2 mm. A test piece of 12.7 mm wide and 55 mm long was cut out from the prepared cured resin plate and immersed in boiling water at 1 atmospheric pressure for 48 hours, and then a glass transition temperature was determined by a DMA (Dynamic Mechanical Analysis) method according to SACMA (Suppliers of Advanced Composite Materials Association) SRM 18R-94. In a storage modulus G' curve, a temperature value at an intersection point of a tangent line in a glass state and a tangent line in a transition state was defined as an glass transition temperature. Here, the glass transition temperature was measured at a temperature raising rate of 5° C./rain and a frequency of 1 Hz.

(3) Measurement Method of Gel Time of Epoxy Resin Composition

The curing reactivity of the epoxy resin composition was evaluated based on torque changes with the passage of time by a curelastometer. Herein, using Rubber Process Analyzer RPA2000 (manufactured by ALPHA TECHNOLOGIES Ltd), a temperature of the epoxy resin composition was raised from 40° C. to 180° C. at a rate of 1.7° C./min and heated at 180° C. for 2 hours. The gel time was defined as a time that elapses before a torque exceeds 1 dNm from a starting point of heating at 40° C.

(4) Evaluation Method of Rapid Curability of Epoxy Resin Composition

A gel time of the epoxy resin composition containing a curing accelerator compounded was compared with a gel time of the epoxy resin composition not containing a curing accelerator compounded, and the rapid curability of the epoxy resin composition was rated according to the following 3-stage criteria. Here, the rapid curability of the resin composition not containing a curing accelerator compounded was rated as C.

A: Resin composition in which a gel time is shortened by 10% or more

B: Resin composition in which a gel time is shortened by 5% or more and less than 10%

C: Resin composition in which a gel time is shortened by less than 5%.

(5) Evaluation Method of Tackiness Properties of Prepreg

Prepregs prepared by impregnating the matrix resin into the reinforced fibers by the hot-melt method were left standing at room temperature for 1 day and at room temperature for 7 days, respectively and their tackiness properties were evaluated. That is, using a tack tester (PICMA Tack Tester II: manufactured by TOYO SEIKI Co., Ltd.), a cover glass with a size of 18 mm×18 mm was press-bonded to the resulting prepreg for 5 seconds with a forth of 0.4 kgf applied, and pulled at a rate of 30 mm/min, and a resisting force at the time of peeling of the glass was measured as a tack. Here, the tack was rated on the following 3-point scale. Measurement was carried out five times, and when measurement results were different, a worse result was employed.

A: A tack value is 0.3 kg or more and 2.0 kg or less, and shows a moderate adherence property.

B: A tack value is 0.1 kg or more and less than 0.3 kg, or larger than 2.0 kg and 3.0 kg or less, and an adherence property is somewhat too strong or somewhat weak.

C: A tack value is less than 0.1 kg or larger than 3.0 kg, and an adherence property is too strong or there is no tackiness properties.

Example 1

(Preparation of Epoxy Resin Composition)

An epoxy resin composition was prepared by the following technique.

Into a kneading apparatus, epoxy resins corresponding a constituent element [A] and a constituent element [D], respectively shown in Table 1, were charged, a temperature of the resulting mixture was raised to 160° C., and heating/kneading was carried out at 160° C. for 1 hour to dissolve the constituent element [D] component.

Then, a temperature was lowered to a temperature of 55 to 65° C. while keeping kneading, and the constituent element [B] and the constituent element [C], respectively shown in Table 1, were added, and the resulting mixture was stirred for 30 minutes to obtain an epoxy resin composition.

With respect to the obtained resin composition, viscosity measurement was carried out according to the aforementioned "(1) Measurement method of viscosity of an epoxy resin composition" of various evaluation methods, and consequently, the magnification of thickening was 1.30 in holding the epoxy resin composition at 80° C. for 2 hours.

Further, with respect to the obtained resin composition, measurement was carried out according to the aforementioned "(2) Measurement method of glass transition temperature of cured epoxy resin object after water absorption" of various evaluation methods, and consequently, the glass transition temperature was 121° C.

Moreover, with respect to the obtained resin composition, a gel time was measured according to the aforementioned "Measurement method of gel time of epoxy resin composition" of various evaluation methods, and consequently, the gel time was 91 minutes. The gel time was shortened by 10% or more compared with Comparative Example 1 (not containing a curing accelerator compounded) described later, and an adequate cure accelerating property was proven.

(Preparation of Prepreg)

The resin composition prepared in the above was applied onto releasing paper using a knife coater to prepare two sheets of resin films having a resin areal weight of 51.2 g/m². Next, the obtained two sheets of resin films were overlaid, from both surfaces of carbon fibers, on carbon fibers serving as the constituent element [E] which were arrayed in one direction so as to become a sheet having a fiber areal weight of 190 g/m², and the resin films were heated/pressurized in the conditions of a temperature of 130° C. and a maximum pressure of 1 MPa to impregnate an epoxy resin composition into carbon fibers to obtain a prepreg.

Constitutions of the constituent elements [A] to [D] in the obtained prepreg were as follows.

Constituent element [A];
"Araldite (registered trademark)" MY0600: 50 parts by mass,
"EPICLON (registered trademark)" 830: 50 parts by mass,
Constituent element [B];
"SEIKACURE (registered trademark)" S: 40 parts by mass,
Constituent element [C];
3-hydroxy-2-naphthoic acid hydrazide: 5 parts by mass,
Constituent element [D];
"SUMIKAEXCEL (registered trademark)" PES 5003P: 15 parts by mass.

In this case, an active hydrogen group contained in the constituent element [B] is 0.9 equivalent and an active hydrogen group contained in the constituent element [C] is 0.07 equivalent with respect to 1 equivalent of the epoxy group contained in the constituent element [A].

(Evaluation of Prepreg Characteristic)

With respect to the obtained prepreg, tackiness properties of the prepreg was evaluated according to the aforementioned "(5) Evaluation method of tackiness properties of a prepreg" of various evaluation methods. Any of the prepreg immediately after being prepared by a hot-melt method and the prepreg after being left standing at room temperature for 7 days had a sufficient adherence property and did not have a problem of molding.

Examples 2 to 43

Epoxy resin compositions were prepared in the same manner as in Example 1 except for changing composition as shown in Tables 1 to 5, a prepreg was prepared by a hot-melt method using each of the prepared epoxy resin compositions, and various measurement of the prepreg was carried out. The results of the various measurement are as shown in Tables 1 to 5.

In Examples 2 and 3, epoxy resin compositions were prepared changing the compounded amount of the constituent element [C] of Example 1 to 15 parts by mass and 25 parts by mass, respectively. All of the resulting resin compositions are found to have the excellent effect of shortening a gel time, and have a magnification of thickening of 2.0 or less after having been held at 80° C. for 2 hours to exhibit excellent thermal stability. With respect to Example 3, the magnification of thickening of the resin composition after having been held at 80° C. for 2 hours was 1.41, and becomes higher than those of Example 1 and Example 2. Further, the tackiness properties of the prepreg after being left standing at room temperature for 7 days was deteriorated to a slightly perceptible level. However, the prepreg could be molded without significantly impairing the work efficiency, and voids were not generated in the resulting fiber reinforced composite material and a practical problem did not arise.

In Examples 4 to 10, epoxy resin compositions were prepared in the same manner as in Examples 1 to 3 except for changing the constituent element [C] to be compounded. In Examples 4 to 10, even when changing a type of the constituent element [C] to be compounded, the resulting resin composition exhibited excellent rapid curability and excellent thermal stability.

In Examples 11 to 40, epoxy resin compositions were prepared in the same manner as in Examples 1 to 10 except for changing types and composition of the constituent elements [A] and [B]. Even when the types and composition of the constituent elements [A] and [B] were changed like Examples 11 to 40, the resulting resin composition exhibited excellent rapid curability and excellent thermal stability.

In Examples 41 to 42, epoxy resin compositions were prepared in the same manner as in Example 33 except for changing the average particle diameters of the constituent element [C]. Even when the average particle diameter of the constituent element [C] was varied, the magnification of thickening of the resin composition after having been held at 80° C. for 2 hours was 2.0 or less to exhibit excellent thermal stability.

In Example 43, an epoxy resin composition was prepared in the same manner as in Example 1 except for changing a type of the constituent element [D]. Even when changing a type of the constituent element [D], the resulting resin composition exhibited excellent rapid curability and excellent thermal stability.

TABLE 1

|  |  | Example 1 | Example 2 | Example 3 | Example 4 | Example 5 |
|---|---|---|---|---|---|---|
| [A] Epoxy resin | Araldite (registered trademark) MY0600 | 50 | 50 | 50 | 50 | 50 |
|  | Araldite (registered trademark) MY0510 |  |  |  |  |  |
|  | ELM434 |  |  |  |  |  |
|  | EPICRON (registered trademark) 830 | 50 | 50 | 50 | 50 | 50 |
|  | jER (registered trademark) 1010 |  |  |  |  |  |
|  | AER (registered trademark) 4152 |  |  |  |  |  |
| [B] Aromatic amine compound | 3,3'-DAS |  |  |  |  |  |
|  | SEIKACURE (registered trademark) S | 40 | 40 | 40 | 40 | 40 |
| [C] Organic acid hydrazide compound | 3-hydroxy-2-naphthoic acid hydrazide | 5 | 15 | 25 |  |  |
|  | 2,6-naphthalenedicarbodihydrazide |  |  |  | 1 | 5 |
|  | Isophthalic dihydrazide |  |  |  |  |  |
| [D] Thermoplastic Resin | PES 5003P | 30 | 30 | 30 | 30 | 30 |
|  | VW-10700RFP |  |  |  |  |  |

TABLE 1-continued

| | | | | | | | |
|---|---|---|---|---|---|---|---|
| [E] Reinforcing Fiber Other Components | Torayca (registered trademark) T800S-24K-10E | | ○ | ○ | ○ | ○ | ○ |
| | Adipic dihydrazide | | | | | | |
| | CUREZOL (registered trademark) 2P4 MHZ-PW | | | | | | |
| | Dodecanediohydrazide | | | | | | |
| | DICY7 | | | | | | |
| | DCMU99 | | | | | | |
| | N,N-dimethylacrylamide | | | | | | |
| Curing Accelerator Characteristics | Melting Point of Curing Accelerator | °C. | 206 | 206 | 206 | >300 | >300 |
| | Particle Diameter of Curing Accelerator | μm | 22 | 22 | 22 | 30 | 30 |
| Resin Composition Characteristics | Viscosity after Being Held at 80° C. for 1 Minute | Pa·s | 46 | 67 | 83 | 41 | 44 |
| | Viscosity after Being Held at 80° C. for 2 Hours | Pa·s | 60 | 90 | 117 | 49 | 53 |
| | Pot Life (Magnification of Thickening) | | 1.30 | 1.34 | 1.41 | 1.19 | 1.21 |
| | Glass Transition Temperature of Cured Resin Object after Absorbing Water | °C. | 121 | 110 | 83 | 123 | 122 |
| | Gel Time | min | 91 | 84 | 78 | 101 | 96 |
| | Rapid Curability | | A | A | A | B | A |
| Prepreg Characteristics | Tackiness after being left standing at room temperature for 1 day | | A | A | A | A | A |
| | Tackiness after being left standing at room temperature for 7 days | | A | A | B | A | A |

| | | | Example 6 | Example 7 | Example 8 | Example 9 | Example 10 |
|---|---|---|---|---|---|---|---|
| [A] Epoxy resin | Araldite (registered trademark) MY0600 | | 50 | 50 | 50 | 50 | 50 |
| | Araldite (registered trademark) MY0510 | | | | | | |
| | ELM434 | | | | | | |
| | EPICRON (registered trademark) 830 | | 50 | 50 | 50 | 50 | 50 |
| | jER (registered trademark) 1010 | | | | | | |
| | AER (registered trademark) 4152 | | | | | | |
| [B] Aromatic amine compound | 3,3'-DAS | | | | | | |
| | SEIKACURE (registered trademark) S | | 40 | 40 | 40 | 40 | 40 |
| [C] Organic acid hydrazide compound | 3-hydroxy-2-naphthoic acid hydrazide | | | | | | |
| | 2,6-naphthalenedicarbodihydrazide | | 15 | 25 | | 15 | 25 |
| | Isophthalic dihydrazide | | | | 5 | | |
| [D] Thermoplastic Resin | PES 5003P | | 30 | 30 | 30 | 30 | 30 |
| | VW-10700RFP | | | | | | |
| [E] Reinforcing Fiber Other Components | Torayca (registered trademark) T800S-24K-10E | | ○ | ○ | ○ | ○ | ○ |
| | Adipic dihydrazide | | | | | | |
| | CUREZOL (registered trademark) 2P4 MHZ-PW | | | | | | |
| | Dodecanediohydrazide | | | | | | |
| | DICY7 | | | | | | |
| | DCMU99 | | | | | | |
| | N,N-dimethylacrylamide | | | | | | |
| Curing Accelerator Characteristics | Melting Point of Curing Accelerator | °C. | >300 | >300 | 220 | 220 | 220 |
| | Particle Diameter of Curing Accelerator | μm | 30 | 30 | 13 | 13 | 13 |
| Resin Composition Characteristics | Viscosity after Being Held at 80° C. for 1 Minute | Pa·s | 63 | 76 | 45 | 65 | 79 |
| | Viscosity after Being Held at 80° C. for 2 Hours | Pa·s | 79 | 102 | 54 | 82 | 107 |
| | Pot Life (Magnification of Thickening) | | 1.25 | 1.34 | 1.19 | 1.26 | 1.35 |
| | Glass Transition Temperature of Cured Resin Object after Absorbing Water | °C. | 109 | 82 | 120 | 108 | 78 |
| | Gel Time | min | 86 | 79 | 88 | 80 | 76 |
| | Rapid Curability | | A | A | A | A | A |
| Prepreg Characteristics | Tackiness after being left standing at room temperature for 1 day | | A | A | A | A | A |
| | Tackiness after being left standing at room temperature for 7 days | | A | A | A | A | A |

TABLE 2

| | | Example 11 | Example 12 | Example 13 | Example 14 | Example 15 |
|---|---|---|---|---|---|---|
| [A] Epoxy resin | Araldite (registered trademark) MY0600 | | | | | |
| | Araldite (registered trademark) MY0510 | 50 | 50 | 50 | 50 | 50 |
| | ELM434 | | | | | |
| | EPICRON (registered trademark) 830 | 50 | 50 | 50 | 50 | 50 |
| | jER (registered trademark) 1010 | | | | | |
| | AER (registered trademark) 4152 | | | | | |
| [B] Aromatic amine compound | 3,3'-DAS | | | | | |
| | SEIKACURE (registered trademark) S | 35 | 35 | 35 | 35 | 35 |
| [C] Organic acid hydrazide compound | 3-hydroxy-2-naphthoic acid hydrazide | 5 | 15 | 25 | | |
| | 2,6-naphthalenedicarbodihydrazide | | | | 1 | 5 |
| | Isophthalic dihydrazide | | | | | |
| [D] Thermoplastic Resin | PES 5003P | 15 | 15 | 15 | 15 | 15 |
| | VW-10700RFP | | | | | |

TABLE 2-continued

| | | | | | | | |
|---|---|---|---|---|---|---|---|
| [E] Reinforcing Fiber Other Components | Torayca (registered trademark) T800S-24K-10E | | ○ | ○ | ○ | ○ | ○ |
| | Adipic dihydrazide | | | | | | |
| | CUREZOL (registered trademark) 2P4 MHZ-PW | | | | | | |
| | Dodecanediohydrazide | | | | | | |
| | DICY7 | | | | | | |
| | DCMU99 | | | | | | |
| | N,N-dimethylacrylamide | | | | | | |
| Curing Accelerator Characteristics | Melting Point of Curing Accelerator | °C. | 206 | 206 | 206 | >300 | >300 |
| | Particle Diameter of Curing Accelerator | μm | 22 | 22 | 22 | 30 | 30 |
| Resin Composition Characteristics | Viscosity after Being Held at 80° C. for 1 Minute | Pa·s | 23 | 44 | 60 | 18 | 21 |
| | Viscosity after Being Held at 80° C. for 2 Hours | Pa·s | 31 | 60 | 86 | 22 | 26 |
| | Pot Life (Magnification of Thickening) | | 1.33 | 1.37 | 1.44 | 1.22 | 1.24 |
| | Glass Transition Temperature of Cured Resin Object after Absorbing Water | °C. | 123 | 112 | 85 | 126 | 124 |
| | Gel Time | min | 94 | 85 | 81 | 103 | 99 |
| | Rapid Curability | | A | A | A | B | A |
| Prepreg Characteristics | Tackiness after being left standing at room temperature for 1 day | | A | A | A | A | A |
| | Tackiness after being left standing at room temperature for 7 days | | A | A | B | A | A |

| | | | Example 16 | Example 17 | Example 18 | Example 19 | Example 20 |
|---|---|---|---|---|---|---|---|
| [A] Epoxy resin | Araldite (registered trademark) MY0600 | | | | | | |
| | Araldite (registered trademark) MY0510 | | 50 | 50 | 50 | 50 | 50 |
| | ELM434 | | | | | | |
| | EPICRON (registered trademark) 830 | | 50 | 50 | 50 | 50 | 50 |
| | jER (registered trademark) 1010 | | | | | | |
| | AER (registered trademark) 4152 | | | | | | |
| [B] Aromatic amine compound | 3,3'-DAS | | | | | | |
| | SEIKACURE (registered trademark) S | | 35 | 35 | 35 | 35 | 35 |
| [C] Organic acid hydrazide compound | 3-hydroxy-2-naphthoic acid hydrazide | | | | | | |
| | 2,6-naphthalenedicarbodihydrazide | | 15 | 25 | | | |
| | Isophthalic dihydrazide | | | | 5 | 15 | 25 |
| [D] Thermoplastic Resin | PES 5003P | | 15 | 15 | 15 | 15 | 15 |
| | VW-10700RFP | | | | | | |
| [E] Reinforcing Fiber Other Components | Torayca (registered trademark) T800S-24K-10E | | ○ | ○ | ○ | ○ | ○ |
| | Adipic dihydrazide | | | | | | |
| | CUREZOL (registered trademark) 2P4 MHZ-PW | | | | | | |
| | Dodecanediohydrazide | | | | | | |
| | DICY7 | | | | | | |
| | DCMU99 | | | | | | |
| | N,N-dimethylacrylamide | | | | | | |
| Curing Accelerator Characteristics | Melting Point of Curing Accelerator | °C. | >300 | >300 | 220 | 220 | 220 |
| | Particle Diameter of Curing Accelerator | μm | 30 | 30 | 13 | 13 | 13 |
| Resin Composition Characteristics | Viscosity after Being Held at 80° C. for 1 Minute | Pa·s | 40 | 53 | 22 | 42 | 56 |
| | Viscosity after Being Held at 80° C. for 2 Hours | Pa·s | 51 | 73 | 27 | 54 | 77 |
| | Pot Life (Magnification of Thickening) | | 1.28 | 1.37 | 1.22 | 1.29 | 1.38 |
| | Glass Transition Temperature of Cured Resin Object after Absorbing Water | °C. | 111 | 84 | 122 | 110 | 80 |
| | Gel Time | min | 87 | 82 | 91 | 81 | 79 |
| | Rapid Curability | | A | A | A | A | A |
| Prepreg Characteristics | Tackiness after being left standing at room temperature for 1 day | | A | A | A | A | A |
| | Tackiness after being left standing at room temperature for 7 days | | A | A | A | A | A |

TABLE 3

| | | Example 21 | Example 22 | Example 23 | Example 24 | Example 25 |
|---|---|---|---|---|---|---|
| [A] Epoxy resin | Araldite (registered trademark) MY0600 | | | | | |
| | Araldite (registered trademark) MY0510 | | | | | |
| | ELM434 | 60 | 60 | 60 | 60 | 60 |
| | EPICRON (registered trademark) 830 | 40 | 40 | 40 | 40 | 40 |
| | jER (registered trademark) 1010 | | | | | |
| | AER (registered trademark) 4152 | | | | | |
| [B] Aromatic amine compound | 3,3'-DAS | | | | | |
| | SEIKACURE (registered trademark) S | 45 | 45 | 45 | 45 | 45 |
| [C] Organic acid hydrazide compound | 3-hydroxy-2-naphthoic acid hydrazide | 5 | 15 | 25 | | |
| | 2,6-naphthalenedicarbodihydrazide | | | | 1 | 5 |
| | Isophthalic dihydrazide | | | | | |
| [D] Thermoplastic Resin | PES 5003P | 15 | 15 | 15 | 15 | 15 |
| | VW-10700RFP | | | | | |

TABLE 3-continued

|  |  |  | | | | | |
|---|---|---|---|---|---|---|---|
| [E] Reinforcing Fiber | Torayca (registered trademark) T800S-24K-10E | | ○ | ○ | ○ | ○ | ○ |
| Other Components | Adipic dihydrazide | | | | | | |
|  | CUREZOL (registered trademark) 2P4 MHZ-PW | | | | | | |
|  | Dodecanediohydrazide | | | | | | |
|  | DICY7 | | | | | | |
|  | DCMU99 | | | | | | |
|  | N,N-dimethylacrylamide | | | | | | |
| Curing Accelerator | Melting Point of Curing Accelerator | °C. | 206 | 206 | 206 | >300 | >300 |
| Characteristics | Particle Diameter of Curing Accelerator | μm | 22 | 22 | 22 | 30 | 30 |
| Resin Composition | Viscosity after Being Held at 80° C. for 1 Minute | Pa·s | 28 | 49 | 65 | 22 | 26 |
| Characteristics | Viscosity after Being Held at 80° C. for 2 Hours | Pa·s | 37 | 66 | 92 | 27 | 32 |
|  | Pot Life (Magnification of Thickening) | | 1.31 | 1.35 | 1.42 | 1.22 | 1.22 |
|  | Glass Transition Temperature of Cured Resin Object after Absorbing Water | °C. | 136 | 124 | 95 | 139 | 137 |
|  | Gel Time | min | 83 | 74 | 70 | 94 | 88 |
|  | Rapid Curability | | A | A | A | B | A |
| Prepreg Characteristics | Tackiness after being left standing at room temperature for 1 day | | A | A | A | A | A |
|  | Tackiness after being left standing at room temperature for 7 days | | A | A | B | A | A |

|  |  |  | Example 26 | Example 27 | Example 28 | Example 29 | Example 30 |
|---|---|---|---|---|---|---|---|
| [A] Epoxy resin | Araldite (registered trademark) MY0600 | | | | | | |
|  | Araldite (registered trademark) MY0510 | | | | | | |
|  | ELM434 | | 60 | 60 | 60 | 60 | 60 |
|  | EPICRON (registered trademark) 830 | | 40 | 40 | 40 | 40 | 40 |
|  | jER (registered trademark) 1010 | | | | | | |
|  | AER (registered trademark) 4152 | | | | | | |
| [B] Aromatic amine compound | 3,3'-DAS | | | | | | |
|  | SEIKACURE (registered trademark) S | | 45 | 45 | 45 | 45 | 45 |
| [C] Organic acid hydrazide compound | 3-hydroxy-2-naphthoic acid hydrazide | | | | | | |
|  | 2,6-naphthalenedicarbodihydrazide | | 15 | 25 | | 15 | 25 |
|  | Isophthalic dihydrazide | | | | 5 | | |
| [D] Thermoplastic Resin | PES 5003P | | 15 | 15 | 15 | 15 | 15 |
|  | VW-10700RFP | | | | | | |
| [E] Reinforcing Fiber | Torayca (registered trademark) T800S-24K-10E | | ○ | ○ | ○ | ○ | ○ |
| Other Components | Adipic dihydrazide | | | | | | |
|  | CUREZOL (registered trademark) 2P4 MHZ-PW | | | | | | |
|  | Dodecanediohydrazide | | | | | | |
|  | DICY7 | | | | | | |
|  | DCMU99 | | | | | | |
|  | N,N-dimethylacrylamide | | | | | | |
| Curing Accelerator | Melting Point of Curing Accelerator | °C. | >300 | >300 | 220 | 220 | 220 |
| Characteristics | Particle Diameter of Curing Accelerator | μm | 30 | 30 | 13 | 13 | 13 |
| Resin Composition | Viscosity after Being Held at 80° C. for 1 Minute | Pa·s | 45 | 58 | 27 | 47 | 61 |
| Characteristics | Viscosity after Being Held at 80° C. for 2 Hours | Pa·s | 57 | 78 | 32 | 60 | 83 |
|  | Pot Life (Magnification of Thickening) | | 1.26 | 1.35 | 1.20 | 1.27 | 1.36 |
|  | Glass Transition Temperature of Cured Resin Object after Absorbing Water | °C. | 123 | 96 | 135 | 122 | 91 |
|  | Gel Time | min | 76 | 71 | 80 | 74 | 70 |
|  | Rapid Curability | | A | A | A | A | A |
| Prepreg Characteristics | Tackiness after being left standing at room temperature for 1 day | | A | A | A | A | A |
|  | Tackiness after being left standing at room temperature for 7 days | | A | A | A | A | A |

TABLE 4

|  |  | Example 31 | Example 32 | Example 33 | Example 34 | Example 35 |
|---|---|---|---|---|---|---|
| [A] Epoxy resin | Araldite (registered trademark) MY0600 | | | | | |
|  | Araldite (registered trademark) MY0510 | 50 | 50 | 50 | 50 | 50 |
|  | ELM434 | | | | | |
|  | EPICRON (registered trademark) 830 | 50 | 50 | 50 | 50 | 50 |
|  | jER (registered trademark) 1010 | | | | | |
|  | AER (registered trademark) 4152 | | | | | |
| [B] Aromatic amine compound | 3,3'-DAS | 35 | 35 | 35 | 35 | 35 |
|  | SEIKACURE (registered trademark) S | | | | | |
| [C] Organic acid hydrazide compound | 3-hydroxy-2-naphthoic acid hydrazide | 5 | 15 | 25 | | |
|  | 2,6-naphthalenedicarbodihydrazide | | | | 1 | 5 |
|  | Isophthalic dihydrazide | | | | | |
| [D] Thermoplastic Resin | PES 5003P | 15 | 15 | 15 | 15 | 15 |
|  | VW-10700RFP | | | | | |

TABLE 4-continued

| | | | | | | | |
|---|---|---|---|---|---|---|---|
| [E] Reinforcing Fiber Other Components | Torayca (registered trademark) T800S-24K-10E | | ○ | ○ | ○ | ○ | ○ |
| | Adipic dihydrazide | | | | | | |
| | CUREZOL (registered trademark) 2P4 MHZ-PW | | | | | | |
| | Dodecanediohydrazide | | | | | | |
| | DICY7 | | | | | | |
| | DCMU99 | | | | | | |
| | N,N-dimethylacrylamide | | | | | | |
| Curing Accelerator Characteristics | Melting Point of Curing Accelerator | °C. | 206 | 206 | 206 | >300 | >300 |
| | Particle Diameter of Curing Accelerator | μm | 22 | 22 | 22 | 30 | 30 |
| Resin Composition Characteristics | Viscosity after Being Held at 80° C. for 1 Minute | Pa·s | 26 | 47 | 63 | 21 | 24 |
| | Viscosity after Being Held at 80° C. for 2 Hours | Pa·s | 36 | 66 | 93 | 26 | 31 |
| | Pot Life (Magnification of Thickening) | | 1.37 | 1.41 | 1.48 | 1.25 | 1.28 |
| | Glass Transition Temperature of Cured Resin Object after Absorbing Water | °C. | 130 | 119 | 87 | 132 | 131 |
| | Gel Time | min | 88 | 79 | 75 | 97 | 92 |
| | Rapid Curability | | A | A | A | B | A |
| Prepreg Characteristics | Tackiness after being left standing at room temperature for 1 day | | A | A | A | A | A |
| | Tackiness after being left standing at room temperature for 7 days | | A | A | B | A | A |

| | | | Example 36 | Example 37 | Example 38 | Example 39 | Example 40 |
|---|---|---|---|---|---|---|---|
| [A] Epoxy resin | Araldite (registered trademark) MY0600 | | | | | | |
| | Araldite (registered trademark) MY0510 | | 50 | 50 | 50 | 50 | 50 |
| | ELM434 | | | | | | |
| | EPICRON (registered trademark) 830 | | 50 | 50 | 50 | 50 | 50 |
| | jER (registered trademark) 1010 | | | | | | |
| | AER (registered trademark) 4152 | | | | | | |
| [B] Aromatic amine compound | 3,3'-DAS | | 35 | 35 | 35 | 35 | 35 |
| | SEIKACURE (registered trademark) S | | | | | | |
| [C] Organic acid hydrazide compound | 3-hydroxy-2-naphthoic acid hydrazide | | | | | | |
| | 2,6-naphthalenedicarbodihydrazide | | 15 | 25 | | | |
| | Isophthalic dihydrazide | | | | 5 | 15 | 25 |
| [D] Thermoplastic Resin | PES 5003P | | 15 | 15 | 15 | 15 | 15 |
| | VW-10700RFP | | | | | | |
| [E] Reinforcing Fiber Other Components | Torayca (registered trademark) T800S-24K-10E | | ○ | ○ | ○ | ○ | ○ |
| | Adipic dihydrazide | | | | | | |
| | CUREZOL (registered trademark) 2P4 MHZ-PW | | | | | | |
| | Dodecanediohydrazide | | | | | | |
| | DICY7 | | | | | | |
| | DCMU99 | | | | | | |
| | N,N-dimethylacrylamide | | | | | | |
| Curing Accelerator Characteristics | Melting Point of Curing Accelerator | °C. | >300 | >300 | 220 | 220 | 220 |
| | Particle Diameter of Curing Accelerator | μm | 30 | 30 | 13 | 13 | 13 |
| Resin Composition Characteristics | Viscosity after Being Held at 80° C. for 1 Minute | Pa·s | 43 | 56 | 25 | 45 | 59 |
| | Viscosity after Being Held at 80° C. for 2 Hours | Pa·s | 57 | 79 | 32 | 60 | 84 |
| | Pot Life (Magnification of Thickening) | | 1.32 | 1.41 | 1.26 | 1.33 | 1.42 |
| | Glass Transition Temperature of Cured Resin Object after Absorbing Water | °C. | 119 | 88 | 130 | 117 | 86 |
| | Gel Time | min | 81 | 76 | 85 | 75 | 71 |
| | Rapid Curability | | A | A | A | A | A |
| Prepreg Characteristics | Tackiness after being left standing at room temperature for 1 day | | A | A | A | A | A |
| | Tackiness after being left standing at room temperature for 7 days | | A | B | A | A | B |

TABLE 5

| | | Example 41 | Example 42 | Example 43 | Comparative Example 1 | Comparative Example 2 |
|---|---|---|---|---|---|---|
| [A] Epoxy resin | Araldite (registered trademark) MY0600 | | | 50 | 50 | |
| | Araldite (registered trademark) MY0510 | 50 | 50 | | | 50 |
| | ELM434 | | | | | |
| | EPICRON (registered trademark) 830 | 50 | 50 | 50 | 50 | 50 |
| | jER (registered trademark) 1010 | | | | | |
| | AER (registered trademark) 4152 | | | | | |
| [B] Aromatic amine compound | 3,3'-DAS | 35 | 35 | | | |
| | SEIKACURE (registered trademark) S | | | 40 | 40 | 35 |
| [C] Organic acid hydrazide compound | 3-hydroxy-2-naphthoic acid hydrazide | 25 | 25 | 5 | | |
| | 2,6-naphthalenedicarbodihydrazide | | | | | |
| | Isophthalic dihydrazide | | | | | |

TABLE 5-continued

| | | | | | | | |
|---|---|---|---|---|---|---|---|
| [D] Thermoplastic Resin | PES 5003P | | | 15 | 15 | | 30 | 15 |
| | VW-10700RFP | | | | | 30 | | |
| [E] Reinforcing Fiber | Torayca (registered trademark) T800S-24K-10E | | | ○ | ○ | ○ | ○ | ○ |
| Other Components | Adipic dihydrazide | | | | | | | |
| | CUREZOL (registered trademark) 2P4 MHZ-PW | | | | | | | |
| | Dodecanedihydrazide | | | | | | | |
| | DICY7 | | | | | | | |
| | DCMU99 | | | | | | | |
| | N,N-dimethylacrylamide | | | | | | | |
| Curing Accelerator | Melting Point of Curing Accelerator | ° C. | | 206 | 206 | 206 | — | — |
| Characteristics | Particle Diameter of Curing Accelerator | μm | | 6 | 72 | 22 | — | — |
| Resin Composition | Viscosity after Being Held at 80° C. for 1 Minute | Pa · s | | 60 | 66 | 31 | 39 | 16 |
| Characteristics | Viscosity after Being Held at 80° C. for 2 Hours | Pa · s | | 110 | 127 | 40 | 46 | 19 |
| | Pot Life (Magnification of Thickening) | | | 1.84 | 1.92 | 1.28 | 1.18 | 1.21 |
| | Glass Transition Temperature of Cured Resin Object after Absorbing Water | ° C. | | 88 | 87 | 122 | 124 | 127 |
| | Gel Time | min | | 71 | 72 | 92 | 108 | 111 |
| | Rapid Curability | | | A | A | A | C | C |
| Prepreg Characteristics | Tackiness after being left standing at room temperature for 1 day | | | A | A | A | A | A |
| | Tackiness after being left standing at room temperature for 7 days | | | B | B | A | A | A |

| | | | Comparative Example 3 | Comparative Example 4 | Comparative Example 5 | Comparative Example 6 | Comparative Example 7 |
|---|---|---|---|---|---|---|---|
| [A] Epoxy resin | Araldite (registered trademark) MY0600 | | | | 50 | 50 | 50 |
| | Araldite (registered trademark) MY0510 | | | 50 | | | |
| | ELM434 | | 60 | | | | |
| | EPICRON (registered trademark) 830 | | 40 | 50 | 50 | 50 | 50 |
| | jER (registered trademark) 1010 | | | | | | |
| | AER (registered trademark) 4152 | | | | | | |
| [B] Aromatic amine compound | 3,3'-DAS | | | 35 | | | |
| | SEIKACURE (registered trademark) S | | 45 | | 40 | 40 | 40 |
| [C] Organic acid hydrazide compound | 3-hydroxy-2-naphthoic acid hydrazide | | | | 35 | | |
| | 2,6-naphthalenedicarbodihydrazide | | | | | | |
| | Isophthalic dihydrazide | | | | | | |
| [D] Thermoplastic Resin | PES 5003P | | 15 | 15 | 15 | 15 | 15 |
| | VW-10700RFP | | | | | | |
| [E] Reinforcing Fiber | Torayca (registered trademark) T800S-24K-10E | | ○ | ○ | ○ | ○ | ○ |
| Other Components | Adipic dihydrazide | | | | | 5 | |
| | CUREZOL (registered trademark) 2P4 MHZ-PW | | | | | | 5 |
| | Dodecanedihydrazide | | | | | | |
| | DICY7 | | | | | | |
| | DCMU99 | | | | | | |
| | N,N-dimethylacrylamide | | | | | | |
| Curing Accelerator | Melting Point of Curing Accelerator | ° C. | — | — | 206 | 180 | 193 |
| Characteristics | Particle Diameter of Curing Accelerator | μm | — | — | 22 | 23 | 3 |
| Resin Composition | Viscosity after Being Held at 80° C. for 1 Minute | Pa · s | 21 | 19 | 91 | 38 | 52 |
| Characteristics | Viscosity after Being Held at 80° C. for 2 Hours | Pa · s | 26 | 25 | 299 | 47 | — |
| | Pot Life (Magnification of Thickening) | | 1.22 | 1.23 | 3.29 | 1.24 | >100 |
| | Glass Transition Temperature of Cured Resin Object after Absorbing Water | ° C. | 147 | 135 | 65 | 110 | 82 |
| | Gel Time | min | 100 | 102 | 71 | 89 | 65 |
| | Rapid Curability | | C | C | A | A | A |
| Prepreg Characteristics | Tackiness after being left standing at room temperature for 1 day | | A | A | C | A | B |
| | Tackiness after being left standing at room temperature for 7 days | | A | A | C | A | C |

Comparative Examples 1 to 16

Epoxy resin compositions were prepared in the same manner as in Example 1 except for changing composition as shown in Tables 5 to 6, a prepreg was prepared by a hot-melt method using each of the prepared epoxy resin compositions, and various measurement of the prepreg was carried out. The results of the various measurement were as shown in Tables 5 to 6.

In Comparative Example 1, an epoxy resin composition was prepared in the same manner as in Example 1 except for not containing the constituent element [C]. Comparative Example 1 was compared with Example 1, and consequently it was found that since the constituent element [C] was not compounded in Comparative Example 1, a gel time of the resulting epoxy resin composition was long, that is, rapid curability was inferior.

Epoxy resin compositions of Comparative Example 2, Comparative Example 3 and Comparative Example 4 were prepared in the same manners as in Example 10, Example 19 and Example 28, respectively, except for not containing the constituent element [C]. It was found that since the constituent element [C] was not compounded in each of Comparative Examples 2 to 4 as with Comparative Example 1, a gel time of the resulting epoxy resin composition was long, and therefore rapid curability was inferior.

With respect to Comparative Example 5, it is found that the magnification of thickening of the resin composition after having been held at 80° C. for 2 hours was high and the thermal stability became lower than that of Example 1 since the compounded amount of the constituent element [C] was out of the range of 1 to 25 parts by mass with respect to 100 parts by mass of the constituent element [A].

In Comparative Example 6, the glass transition temperature of the cured resin after absorbing water became lower than Example 1 because an aliphatic hydrazide compound which was not the organic acid hydrazide compound represented by the general formula (I) or the general formula (II) was used as a curing accelerator in place of the constituent element [C].

In Comparative Example 7, the magnification of thickening of the resin composition after having been held at 80° C. for 2 hours exceeded 100 and the thermal stability became low to such an extent that the resin was cured during measuring the viscosity because a compound which was not the organic acid hydrazide compound represented by the general formula (I) or the general formula (II) was used as a curing accelerator in place of the constituent element [C].

In Comparative Examples 8 to 12, the glass transition temperatures of the cured resins after absorbing water were lowered because the aliphatic hydrazide compounds which were not the organic acid hydrazide compound represented by the general formula (I) or the general formula (II) were used as a curing accelerator in place of the constituent element [C].

In Comparative Examples 13 to 14, the magnifications of thickening of the resin compositions after having been held at 80° C. for 2 hours were 2.0 or more and the thermal stability was considerably lowered because DICY7 and DCMU99 were compounded as a curing accelerator in place of the constituent element [C]. As a result of this, the tackiness properties of the prepreg after being left standing at room temperature for 7 days was considerably lowered, and the impregnating property of a resin into a reinforced fiber was lowered in the prepreg production step.

In Comparative Examples 15 to 16, as with the hydrazide compound, N,N-dimethylacrylamide having an amide group in its molecule was compounded as a curing accelerator in place of the constituent element [C]. Even though N,N-dimethylacrylamide was compounded, the resin composition did not have such rapid curability that the hydrazide compound has, and the glass transition temperature of the cured resin after absorbing water was lowered.

TABLE 6

| | | | Comparative Example 8 | Comparative Example 9 | Comparative Example 10 | Comparative Example 11 | Comparative Example 12 |
|---|---|---|---|---|---|---|---|
| [A] Epoxy resin | Araldite (registered trademark) MY0600 | | | | | | |
| | Araldite (registered trademark) MY0510 | | 60 | 60 | 60 | 60 | 60 |
| | ELM434 | | | | | | |
| | EPICRON (registered trademark) 830 | | 40 | 40 | 40 | 40 | 40 |
| | jER (registered trademark) 1010 | | 10 | | | | 15 |
| | AER (registered trademark) 4152 | | | | | | |
| [B] Aromatic amine compound | 3,3'-DAS | | 40 | 35 | 35 | 35 | 35 |
| | SEIKACURE (registered trademark) S | | | | | | |
| [C] Organic acid hydrazide compound | 3-hydroxy-2-naphthoic acid hydrazide | | | | | | |
| | 2,6-naphthalenedicarbodihydrazide | | | | | | |
| | Isophthalic dihydrazide | | | | | | |
| [D] Thermoplastic Resin | PES 5003P | | 14 | 15 | 15 | 14 | 14 |
| | VW-10700RFP | | | | | | |
| [E] Reinforcing Fiber | Torayca (registered trademark) T800S-24K-10E | | ○ | ○ | ○ | ○ | ○ |
| Other Curing Accelerators | Adipic dihydrazide | | | | 5 | | |
| | CUREZOL (registered trademark) 2P4 MHZ-PW | | | | | | |
| | Dodecanediohydrazide | | 7 | | 5 | 5 | 5 |
| | DICY7 | | | | | 2 | 2 |
| | DCMU99 | | | | | | |
| | N,N-dimethylacrylamide | | | | | | |
| Curing Accelerator Characteristics | Melting Point of Curing Accelerator | ° C. | 190 | 180 | 190 | 190 | 190 |
| | Particle Diameter of Curing Accelerator | μm | 7 | 23 | 7 | 7 | 7 |
| Resin Composition Characteristics | Viscosity after Being Held at 80° C. for 1 Minute | Pa · s | 17 | 31 | 30 | 18 | 26 |
| | Viscosity after Being Held at 80° C. for 2 Hours | Pa · s | 22 | 38 | 40 | 34 | 50 |
| | Pot Life (Magnification of Thickening) | | 1.31 | 1.23 | 1.32 | 1.87 | 1.92 |
| | Glass Transition Temperature of Cured Resin Object after Absorbing Water | ° C. | 102 | 104 | 112 | 106 | 105 |
| | Gel Time | min | 86 | 87 | 86 | 81 | 80 |
| | Rapid Curability | | A | A | A | A | A |
| Prepreg Characteristics | Tackiness after being left standing at room temperature for 1 day | | A | A | A | A | A |
| | Tackiness after being left standing at room temperature for 7 days | | A | A | A | A | A |

| | | Comparative Example 13 | Comparative Example 14 | Comparative Example 15 | Comparative Example 16 |
|---|---|---|---|---|---|
| [A] Epoxy resin | Araldite (registered trademark) MY0600 | 100 | 60 | | |
| | Araldite (registered trademark) MY0510 | | | | |
| | ELM434 | | | 10 | 10 |
| | EPICRON (registered trademark) 830 | | 40 | 20 | 20 |
| | jER (registered trademark) 1010 | | | | |
| | AER (registered trademark) 4152 | | | 70 | 70 |

TABLE 6-continued

| | | | | | | |
|---|---|---|---|---|---|---|
| [B] Aromatic amine compound | 3,3'-DAS | | | | 25 | |
| | SEIKACURE (registered trademark) S | | 60 | 45 | | 25 |
| [C] Organic acid hydrazide compound | 3-hydroxy-2-naphthoic acid hydrazide | | | | | |
| | 2,6-naphthalenedicarbodihydrazide | | | | | |
| | Isophthalic dihydrazide | | | | | |
| [D] Thermoplastic Resin | PES 5003P | | 15 | 15 | 5 | 5 |
| | VW-10700RFP | | | | | |
| [E] Reinforcing Fiber | Torayca (registered trademark) T800S-24K-10E | | ◯ | ◯ | ◯ | ◯ |
| Other Curing Accelerators | Adipic dihydrazide | | | | | |
| | CUREZOL (registered trademark) 2P4 MHZ-PW | | | | | |
| | Dodecanedihydrazide | | | | | |
| | DICY7 | | 2 | 2 | | |
| | DCMU99 | | 4 | 4 | | |
| | N,N-dimethylacrylamide | | | | 5 | 5 |
| Curing Accelerator Characteristics | Melting Point of Curing Accelerator | ° C. | 210 | 210 | −40 | −40 |
| | Particle Diameter of Curing Accelerator | μm | 3 | 3 | liquid | liquid |
| Resin Composition Characteristics | Viscosity after Being Held at 80° C. for 1 Minute | Pa · s | 19 | 17 | 17 | 18 |
| | Viscosity after Being Held at 80° C. for 2 Hours | Pa · s | 48 | 44 | 22 | 23 |
| | Pot Life (Magnification of Thickening) | | 2.51 | 2.59 | 1.31 | 1.27 |
| | Glass Transition Temperature of Cured Resin Object after Absorbing Water | ° C. | 62 | 58 | 109 | 112 |
| | Gel Time | min | 77 | 75 | 95 | 101 |
| | Rapid Curability | | A | A | C | C |
| Prepreg Characteristics | Tackiness after being left standing at room temperature for 1 day | | C | C | A | A |
| | Tackiness after being left standing at room temperature for 7 days | | C | C | A | A |

The invention claimed is:

1. An epoxy resin composition comprising the following constituent elements [A], [B], [C] and [D]:
   100 parts by mass of [A]: epoxy resin,
   [B]: aromatic amine compound,
   1 to 25 parts by mass of [C]: particles of organic acid hydrazide compound having an average particle diameter of 30 μm or less and a structural formula represented by a general formula (I) or a general formula (II):

[Chemical Formula 1]

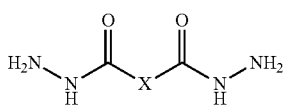
(I)

[Chemical Formula 2]

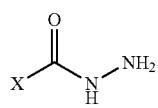
(II)

in which X is a structure selected from monocyclic aromatic ring structures, polycyclic aromatic ring structures and aromatic heterocyclic structures, and optionally has, as a substituent, any of alkyl groups having 4 or less carbon atoms, a hydroxyl group and an amino group, and
   15 to 30 parts by mass of [D]: thermoplastic resin,
   wherein constituent elements [B] and [C] are present in amounts such that a total of active hydrogen groups of constituent elements [B] and [C] is 0.7 to 1.3 equivalent with respect to 1 equivalent of epoxy groups in constituent element [A];
   wherein the epoxy resin composition has an initial viscosity measured after being held at 80° C. for 1 minute of 5 to 100 Pas; and
   wherein the epoxy resin composition has a viscosity measured after being held at 80° C. for 2 hours of up to 2.0 times larger than the initial viscosity.

2. The epoxy resin composition according to claim 1 comprising 1 to 5 parts by mass of the constituent element [C]; and
   wherein an object, obtained by curing the epoxy resin composition at 180° C. for 2 hours and subsequently immersing the cured composition in boiling water at 1 atmospheric pressure for 48 hours, has a glass transition temperature of 115° C. or higher.

3. The epoxy resin composition according to claim 1 comprising 1 to 15 parts by mass of the constituent element [C];
   wherein the constituent element [A] comprises a bisphenol type epoxy resin and a tetraglycidyl amine type epoxy resin; and
   wherein an object, obtained by curing the epoxy resin composition at 180° C. for 2 hours and subsequently immersing the cured composition in boiling water at 1 atmospheric pressure for 48 hours, has a glass transition temperature of 115° C. or higher.

4. The epoxy resin composition according to claim 1 comprising 1 to 15 parts by mass of the constituent element [C];
   wherein the constituent element [B] comprises 3,3'-diaminodiphenylsulfone; and
   wherein an object, obtained by curing the epoxy resin composition at 180° C. for 2 hours and subsequently immersing the cured composition in boiling water at 1 atmospheric pressure for 48 hours, has a glass transition temperature of 115° C. or higher.

5. The epoxy resin composition according to claim 1, wherein a melting point of the constituent element [C] is 180° C. or higher.

6. The epoxy resin composition according to claim 1, wherein the constituent element [C] is at least one compound selected from the group consisting of 3-hydroxy-2-naphthoic acid hydrazide, 2,6-naphthalenedicarbodihydrazide and isophthalic dihydrazide.

7. A prepreg formed by impregnating the epoxy resin composition according to claim 1 into reinforced fibers.

8. A fiber reinforced composite material formed by curing the prepreg according to claim 7.

9. A cured resin formed by curing the epoxy resin composition according to claim 1.

10. A fiber reinforced composite material containing the cured resin according to claim 9 and reinforced fibers.

11. An epoxy resin composition comprising the following constituent elements [A], [B], [C] and [D]:
- 100 parts by mass of [A]: epoxy resin,
- [B]: aromatic amine compound,
- 1 to 25 parts by mass of [C]: particles of 3-hydroxy-2-naphthoic acid hydrazide having an average particle diameter of 30 μm or less, and
- 5 to 40 parts by mass of [D]: thermoplastic resin,
- wherein constituent elements [B] and [C] are present in amounts such that a total of active hydrogen groups of constituent elements [B] and [C] is 0.7 to 1.3 equivalent with respect to 1 equivalent of epoxy groups in constituent element [A];
- wherein the epoxy resin composition has an initial viscosity measured after being held at 80° C. for 1 minute of 0.5 to 200 Pas; and
- wherein the epoxy resin composition has a viscosity measured after being held at 80° C. for 2 hours of up to 2.0 times larger than the initial viscosity.

* * * * *